US008052835B2

(12) United States Patent
Merrill et al.

(10) Patent No.: US 8,052,835 B2
(45) Date of Patent: Nov. 8, 2011

(54) SYSTEM AND METHOD FOR REMOVING INCORRECT LABELS FROM A WEB OF LABELS

(75) Inventors: Dale C. Merrill, Enfield, NH (US); Ernest L. Goodwin, Enfield, NH (US)

(73) Assignee: New Jersey Machine Inc., Lebanon, NH (US)

( * ) Notice: Subject to any disclaimer, the term of this patent is extended or adjusted under 35 U.S.C. 154(b) by 28 days.

(21) Appl. No.: 12/412,866

(22) Filed: Mar. 27, 2009

(65) Prior Publication Data

US 2009/0205781 A1 Aug. 20, 2009

Related U.S. Application Data

(63) Continuation of application No. PCT/US2007/082616, filed on Oct. 26, 2007.

(60) Provisional application No. 60/863,196, filed on Oct. 27, 2006.

(51) Int. Cl.
*B32B 38/10* (2006.01)

(52) U.S. Cl. ........ 156/707; 156/715; 156/719; 156/758; 156/759; 156/767; 156/933

(58) Field of Classification Search .................. 156/247, 156/344, 584, 707, 715, 719, 758, 759, 767, 156/933
See application file for complete search history.

(56) References Cited

U.S. PATENT DOCUMENTS 3,772,123 A 11/1973 Clark et al.
4,017,350 A 4/1977 Thomas
5,232,540 A * 8/1993 Southwell et al. ............ 156/361
5,405,482 A 4/1995 Morrissette et al.
5,938,890 A 8/1999 Schlinkmann et al.
6,450,227 B1 9/2002 Labardi
6,471,802 B1 10/2002 Williamson
6,841,018 B2 1/2005 Pituch et al.

FOREIGN PATENT DOCUMENTS

DE 3152881 A1 10/1981
DE 3609789 A1 3/1986
DE 29606522 U1 4/1996

* cited by examiner

*Primary Examiner* — Mark A Osele
(74) *Attorney, Agent, or Firm* — Gesmer Updegrove LLP

(57) ABSTRACT

An incorrect label removal system is disclosed for removing unwanted labels from a web of labels in a labeling machine. The incorrect label removal system includes a label peel assembly positioned between two fixed points along the direction of travel of the web of labels. The label peel assembly provides a first orientation in which labels remain on the web as the web passes the label peel assembly, and selectively provides a second orientation in which labels are removed from the web. The label peel assembly provides that a length of the web between the two fixed points is substantially the same when the label peel assembly is in each of the first orientation and the second orientation.

20 Claims, 6 Drawing Sheets

SYSTEM AND METHOD FOR REMOVING INCORRECT LABELS FROM A WEB OF LABELS

PRIORITY

The present application is a continuation application of PCT Patent Application PCT/US07/82616 filed Oct. 26, 2007, which claims priority to U.S. Provisional Patent Application Ser. No. 60/863,196 filed Oct. 27, 2006.

BACKGROUND

The invention relates to labeling machines in which labels are continuously or intermittently transferred from a web to articles, and relates in particular to labeling machines in which labels are checked and, if necessary, redirected so that unwanted labels are not applied to articles.

For example, U.S. Pat. No. 3,772,123 discloses a label reject mechanism for a labeling machine that includes a pinch wheel on an actuated arm that selectively engages incorrect labels between the pinch wheel and a rotating wheel, preventing them from being applied to a vacuum actuator drum.

U.S. Pat. No. 5,405,482 discloses a labeling machine that includes a label scanning unit for scanning labels on a web, as well as a label removal unit that includes a single freely rotating roller. If an incorrect label is detected by the label scanning unit, then the incorrect label is removed from a rotating label applicator drum by having the label removal unit advance the roller into contact with the adhesive side of the incorrect label on the applicator drum. The incorrect label would then be removed from the roller.

U.S. Pat. No. 6,841,018 also discloses a labeling machine including a label reconciliation device that selectively advances actuating arm that terminates in a roller toward incorrect labels while on a vacuum drum 7. The reconciliation device further includes a reject label web onto which rejected labels are applied so that they are removed from the label application assembly.

U.S. Pat. No. 6,450,227 discloses a labeling machine that includes a label check station having an actuator for moving a casing from a rest position that does not interrupt the normal direction of flow of a web of labels to a working position that changes the direction of flow of the web of labels so that the incorrect label may be directed off of the web and onto a rotating reject label core.

Conventional label reject systems, however, generally either remove labels from an applicator drum, or change the direction of travel of a web prior to reaching an applicator stage. Changing the direction of travel of a web to remove labels typically changes the path length of web in order to remove the rejected label from the web. Even small changes in a path length, however, can adversely affect the performance of a labeling machine that relies on high speeds and precision timing.

There is a need, therefore, for an improved label removal system that more efficiently and effectively removes labels from a web.

SUMMARY

The invention provides an incorrect label removal system for removing unwanted labels from a web of labels in a labeling machine. In accordance with an embodiment, the incorrect label removal system includes a label peel assembly positioned between two fixed points along the direction of travel of the web of labels. The label peel assembly provides a first orientation in which labels remain on the web as the web passes the label peel assembly, and selectively provides a second orientation in which labels are removed from the web. The label peel assembly provides that a length of the web between the two fixed points is substantially the same when the label peel assembly is in each of the first orientation and the second orientation.

In accordance with another embodiment, the incorrect label removal system includes a pair of idler rollers, and a label peel assembly a positioned between the pair of idler rollers such that a web of labels passes between and in contact with each of the pair of idler rollers and the label peel assembly. The label peel assembly provides a first orientation in which labels remain on the web as the web passes the label peel assembly, and selectively provide a second orientation in which labels are removed from the web. A distance between the pair of idler rollers remains constant when the label peel assembly is in each of the first orientation and the second orientation. A path length of the web between the pair of idler rollers remains substantially constant when the label peel assembly is in each of the first orientation and the second orientation.

In accordance with a further embodiment, the invention provides a method of removing unwanted labels from a label web in a labeling machine. The method includes the steps of causing a web of labels to travel a first distance through a label removal assembly that includes a pair of idler rollers and a peel roll with the labels remaining in the web while the peel roll is maintained in a first orientation, detecting an incorrect label on the web of labels in advance of the label removal assembly and providing a detection signal, and changing the orientation of the peel roll to a second orientation response to the detection signal such that the incorrect label is separated from the web of labels when the web of labels passes the peel roll such that the web travels a second distance through the label removal assembly that is substantially the same as the first distance.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

Figure 1:
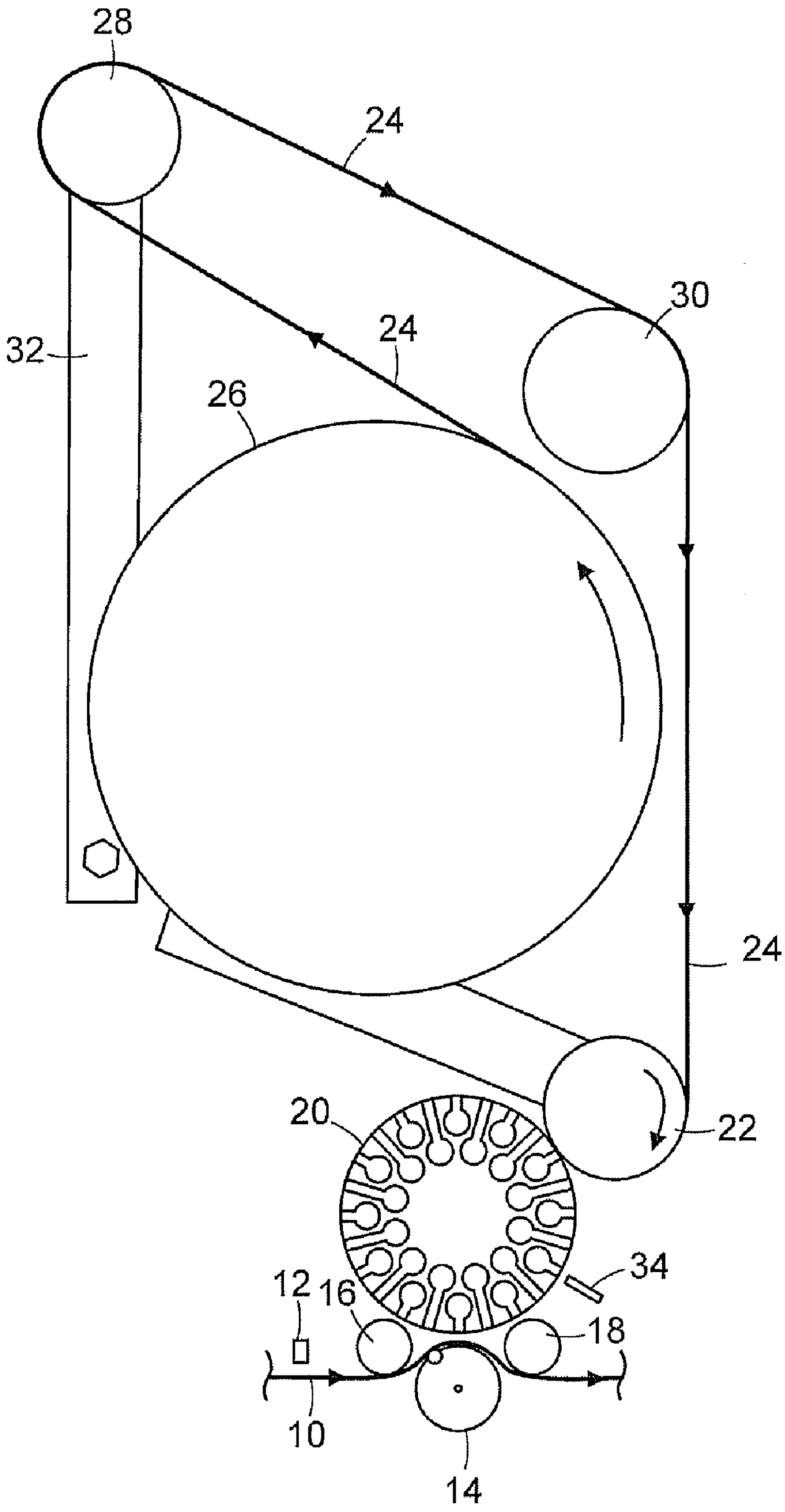
FIG. 1 shows an illustrative diagrammatic plan view of a system in accordance with an embodiment of the invention.

A labeling machine in accordance with an embodiment of the invention includes a reject label system as shown in FIG. 1 that includes a web 10, a first sensor 12, peel roll 14, a pair of idler rollers 16, 18 and a vacuum spindle 20 for receiving labels that have been identified as being incorrect. The system also includes a reject label drum 22 for receiving a reject label web 24. The reject label web 24 is unwound from a reject label supply roll 26 to the drum 22 around idle rollers 28 and 30, and the idler roller 28 is mounted on a spring biased dancer arm 32 that maintains a desired tension in the reject label web as it advances from the supply roll 26 to the drum 22.

Figure 2:
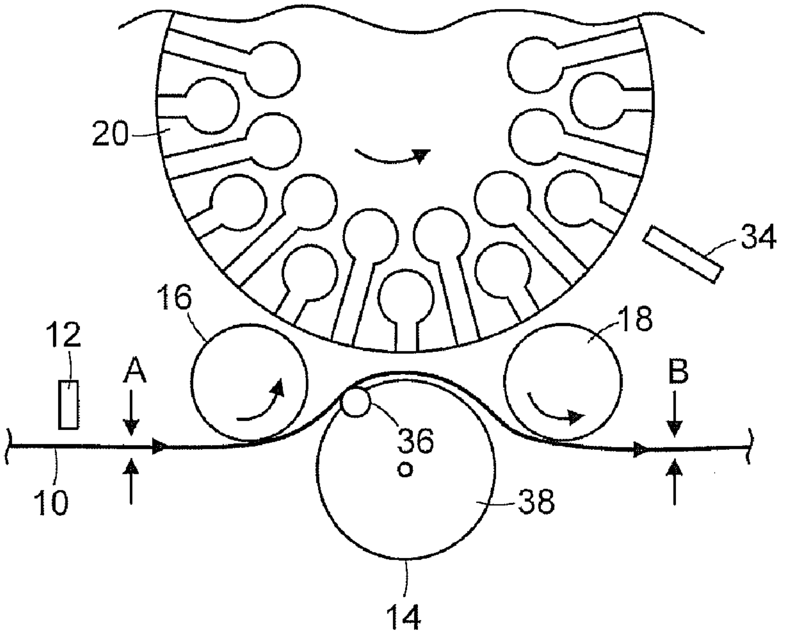
FIG. 2 shows an illustrative diagrammatic view of the peel roll of FIG. 1 during normal operation.

As further shown in FIG. 2, during normal operation, the web 10 carries labels past the rollers 16 and 18 while the peel roll remains in a fixed position. The label side of the web is adjacent the rollers 16 and 18, while the non-label side of the web travels along the peel roll 14 without causing the labels to become separated from the web.

Figure 3:
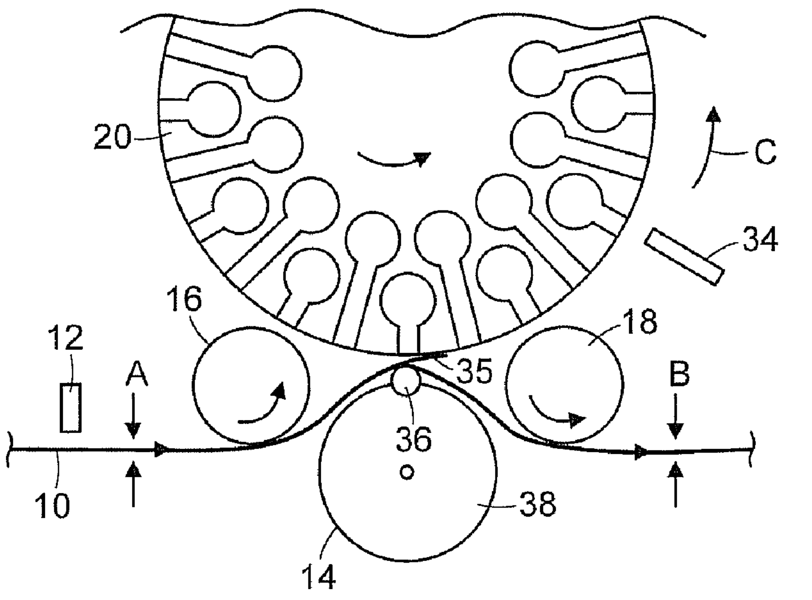
FIG. 3 shows an illustrative diagrammatic view of the peel roll of FIG. 1 during an incorrect label removal operation.

When an incorrect label is detected by one or more sensors, such as sensor 12, the peel roll 14 is rotated 45 degrees, which causes a peel edge rod element 36 on the peel roll 14 to be positioned opposite the vacuum spindle 20 as shown in FIG. 3. The peel roll 14 now causes the adjacent incorrect label 35 to be peeled from the web, and a leading edge of the incorrect label 35 is transferred to the vacuum drum 20. The second sensor 34 verifies that the incorrect label has been received by the drum 20 as the label travels toward the drum 22 as shown at C. The drum 20 and web 24 may run continuously or may be moved responsive to the detection of an incorrect label in various embodiments.

Figure 4:
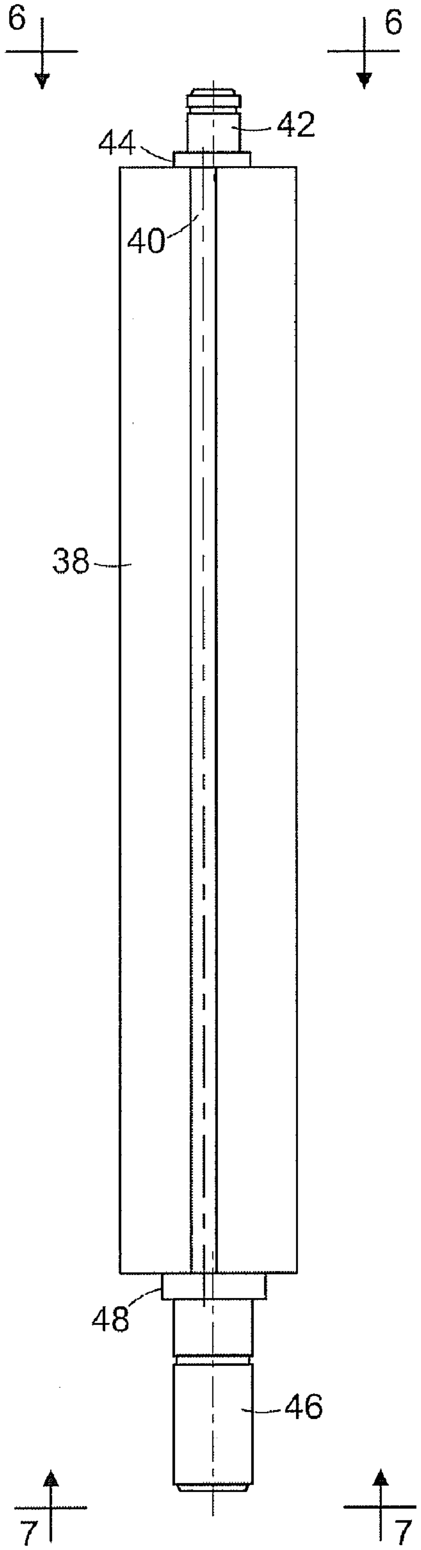
FIG. 4 shows an illustrative diagrammatic view of a first portion of the peel roll of FIGS. 2 and 3.
Figure 5:
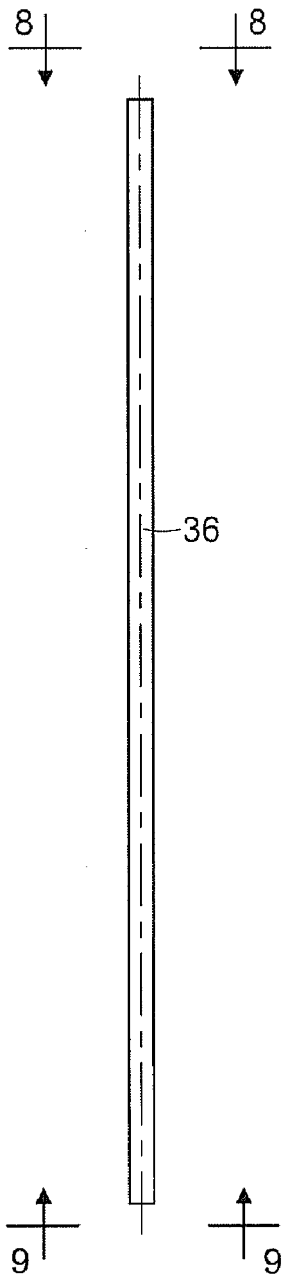
FIG. 5 shows an illustrative diagrammatic view of a second portion of the peel roll of FIGS. 2 and 3.

As further shown in FIGS. 4 and 5, the roll 14 includes the rod element 36 and a shaft 38. The rod element 36 is received within a recess 40 in the shaft 38 such that a portion of the rod element protrudes from the circumferential surface of the shaft 38. The rod element 36 may have a diameter, for example, that is about 7 times smaller than the diameter of the shaft 38. In further embodiments, the peel roll 14 may be formed of a unitary structure, for example, by molding or machining. The peel roll 14 may be formed of any of metal, ceramic or thermoplastic materials.

Figure 6:
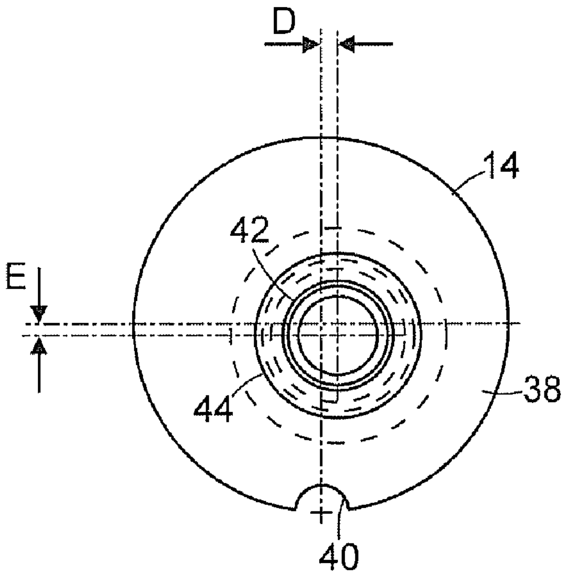
FIG. 6 shows an illustrative diagrammatic top view of the first portion of the peel roll shown in FIG. 4 taken along line 6-6 thereof.
Figure 8:
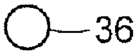
FIG. 8 shows an illustrative diagrammatic top view of the second portion of the peel roll shown in FIG. 5 taken along line 8-8 thereof.
Figure 7:
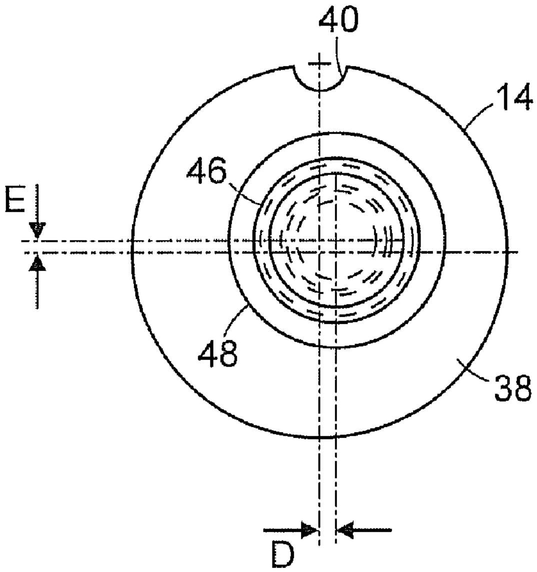
FIG. 7 shows an illustrative diagrammatic bottom view of the first portion of the peel roll shown in FIG. 4 taken along line 7-7 thereof.
Figure 9:
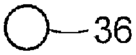
FIG. 9 shows an illustrative diagrammatic bottom view of the second portion of the peel roll shown in FIG. 5 taken along line 9-9 thereof.

The system further provides that the web path length between arbitrary fixed points A and B as shown in FIGS. 2 and 3 remains the same length when the roll 14 is rotated between the positions shown in FIGS. 2 and 3. This is achieved by providing that the roll 14 is mounted on an off-center shaft. In particular, and as shown in FIGS. 6 and 7, the shaft 38 includes mounting posts 42 and 46 that are coupled to bases 44 and 48 respectively on either end of the shaft 38. The posts 42, 46 and bases 44, 48 are not, however, centered on the shaft 38, but rather are slightly offset by, for example, a distance D in one direction and a distance E in a perpendicular direction as shown in FIGS. 6 and 7. FIGS. 8 and 9 show top and bottom end views of the rod element 36.

Figure 10:
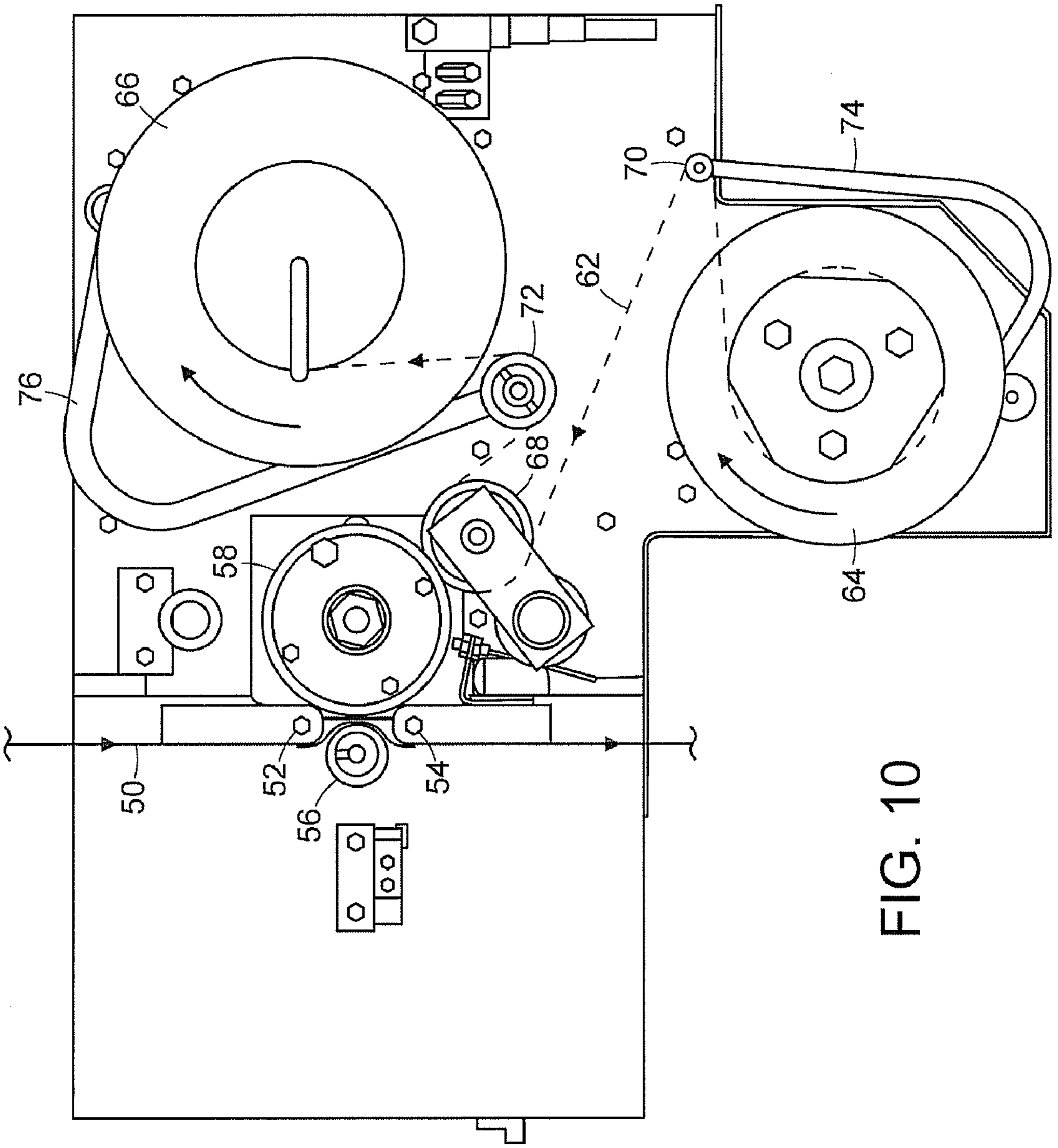
FIG. 10 shows an illustrative diagrammatic plan view of a system in accordance with another embodiment of the invention.
Figure 11:
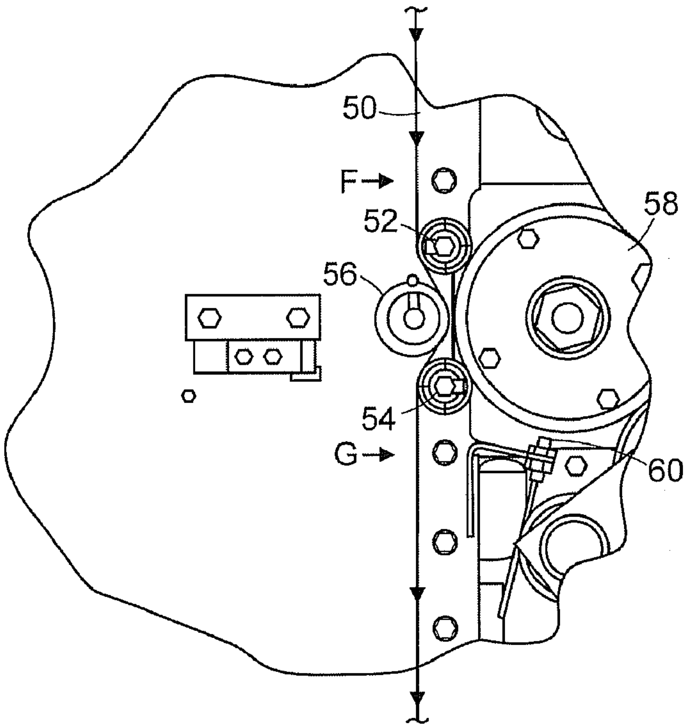
FIG. 11 shows an illustrative diagrammatic view of the peel roll of FIG. 10 during normal operation.
Figure 12:
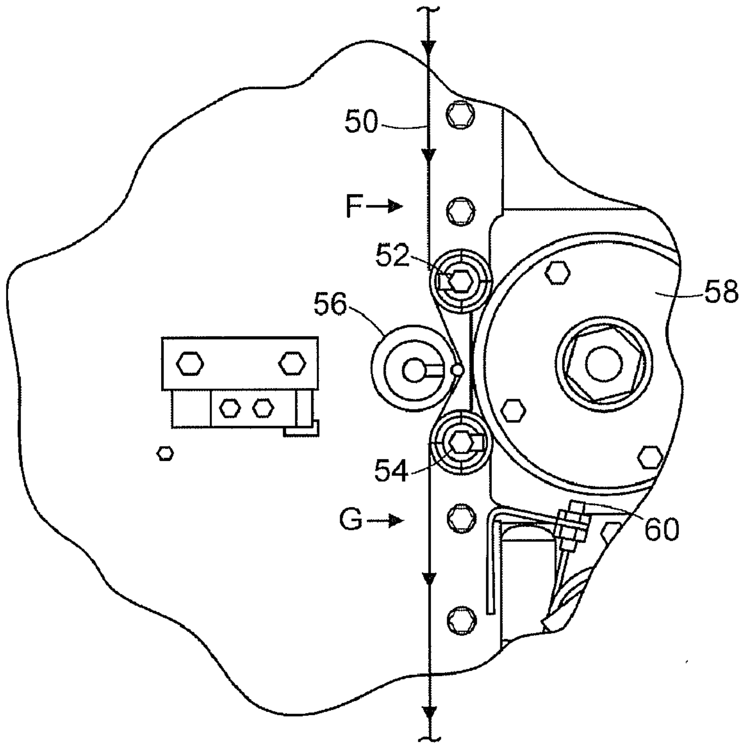
FIG. 12 shows an illustrative diagrammatic view of the peel roll of FIG. 10 during an incorrect label removal operation.

As shown in FIGS. 10-12, a system in accordance with a further embodiment of the invention includes a web 50 of labels that travels between idler rollers 52 and 54, and over peel roll 56. Incorrect labels are transferred to a vacuum drum 58 when the peel roll 56 is rotated such that a small radius portion of the roll 56 is positioned opposite the drum 58 as shown in FIG. 12. The length of the web 50 between points F and G as it passes over the roll 56 remains constant when the roll 56 is moved from the normal position (shown in FIG. 11) the label reject position (shown in FIG. 12).

Incorrect labels are identified by a sensor that is positioned near the web 50 in advance of the system shown in FIG. 10. A sensor 60 may be employed to confirm transfer to the drum of the incorrect labels as shown in FIGS. 11 and 12. A reject label web 62 is arranged to be drawn from a supply roll 64 via roller 68 and rollers 70 and 72 that are mounted in dancer arms 74 and 76 respectively.

In further embodiments, the label reject system may accommodate for different lengths of labels by providing a plurality of peel rolls along the web or by providing that the label reject system may be adjusted. In further embodiments, the peel roll may be formed of a solid piece of material or of a combination of component parts.

Those skilled in the art will appreciate that numerous modifications and variation may be made to the above disclosed embodiments without departing from the spirit and scope of the invention.

What is claimed is:

1. An incorrect label removal system for removing unwanted labels from a web of labels in a labeling machine, said incorrect label removal system comprising:

a label peel assembly positioned between two fixed points along the direction of travel of the web of labels, said label peel assembly including a unitary peel unit having continuous outer surfaces from which labels may be selectively separated from the web due to the direction of travel of the web around at least a portion of said unitary peel unit, said unitary peel unit providing a first orientation in which the web travels around a non-peel portion of the outer surfaces of the unitary peel unit such that labels remain on the web as the web passes over the non-peel portion, and said unitary peel unit selectively providing a second orientation in which the web travels around a peel portion of the outer surfaces of the unitary peel unit such that labels are removed from the web as the web passes over the peel portion, wherein the non-peel portion is continuous with the peel portion, and wherein said label peel assembly provides that a length of the web between the two fixed points is substantially the same when the label peel assembly is in each of the first orientation and the second orientation.

2. The incorrect label removal system as claimed in claim 1, wherein said label peel assembly includes a first generally cylindrical portion having a first diameter of twice the first radius, and a second generally cylindrical portion having a second diameter of twice the second radius that is substantially smaller than the first diameter.

3. The incorrect label removal system as claimed in claim 2, wherein said second diameter is about seven times smaller than the first diameter.

4. The incorrect label removal system as claimed in claim 1, wherein said label peel assembly rotates about 45 degrees to move from the first orientation to the second orientation.

5. The incorrect label removal system as claimed in claim 1, wherein said label peel assembly is circular about a central axis and is mounted for rotation about a rotation axis that is offset by a non-zero amount from the central axis.

6. The incorrect label removal system as claimed in claim 1, wherein said incorrect label removal system further includes a rejected label web for receiving rejected labels from the label peel assembly.

7. The incorrect label removal system as claimed in claim 6, wherein said rejected label web receives rejected labels from the label peel assembly via a vacuum drum.

8. The incorrect label removal system as claimed in claim 7, wherein said system further includes an incorrect label removed confirmation sensor for detecting whether said rejected label is on the vacuum drum.

9. An incorrect label removal system for removing unwanted labels from a web of labels in a labeling machine, said incorrect label removal system comprising:

a pair of idler rollers; and a label peel assembly positioned between said pair of idler rollers such that a web of labels passes between and in contact with each of said pair of idler rollers and said label peel assembly, said label peel assembly including a unitary peel unit having contiguous outer surfaces from which labels may be selectively separated from the web due to the direction of travel of the web around at least a portion of said peel unit, said unitary peel unit providing a first orientation in which the web travels around a non-peel portion of the outer surfaces such that labels remain on the web as the web passes through the label peel assembly, and said unitary peel unit selectively providing a second orientation in which the web travels around a peel portion of the outer surfaces such that labels are removed from the web, said peel portion of the outer surfaces being contiguous with the non-peel portion of the outer surfaces;

wherein a distance between the pair of idler rollers remains constant when the label peel assembly is in each of the first orientation and the second orientation, and a path length of the web between the pair of idler rollers remains substantially constant when the label peel assembly is in each of the first orientation and the second orientation.

10. The incorrect label removal system as claimed in claim 9, wherein said label peel assembly includes a first generally cylindrical portion having a first diameter, and a second generally cylindrical portion having a second diameter that is substantially smaller than the first diameter.

11. The incorrect label removal system as claimed in claim 9, wherein said second diameter is about seven times smaller than the first diameter.

12. The incorrect label removal system as claimed in claim 9, wherein said label peel assembly rotates about 45 degrees to move from the first orientation to the second orientation.

13. The incorrect label removal system as claimed in claim 9, wherein said label peel assembly is circular about a central axis and is mounted for rotation about a rotation axis that is offset by a non-zero amount from the central axis.

14. The incorrect label removal system as claimed in claim 9, wherein said incorrect label removal system further includes a rejected label web for receiving rejected labels from the label peel assembly.

15. The incorrect label removal system as claimed in claim 14, wherein said rejected label web receives rejected labels from the label peel assembly via a vacuum drum.

16. The incorrect label removal system as claimed in claim 15, wherein said system further includes an incorrect label removed confirmation sensor for detecting whether said rejected label is on the vacuum drum.

17. A method of removing unwanted labels from a label web in a labeling machine, said method comprising the steps of:

causing a web of labels to travel a first distance through a label removal assembly that includes a pair of idler rollers and a unitary peel roll, said labels remaining on the web while the peel roll is maintained in a first orientation such that a non-peel surface of the unitary peel roll is in contact with the web;

detecting an incorrect label on the web of labels in advance of the label removal assembly and providing a detection signal; and changing the orientation of the unitary peel roll to a second orientation responsive to the detection signal such that a peel surface of the unitary peel roll is in contact with the web causing the incorrect label to be separated from the web of labels when the web of labels passes the peel roll due to the direction of travel of the web around at least a portion the peel surface of said peel roll and such that the web travels a second distance through the label removal assembly that is substantially the same as the first distance, said peel surface being continuous with the non-peel surface.

18. The method as claimed in claim 17, wherein said label peel assembly includes a first generally cylindrical portion having a first diameter, and a second generally cylindrical portion having a second diameter that is substantially smaller than the first diameter.

19. The method as claimed in claim 17, wherein the label peel assembly rotates about 45 degrees during the step of changing the orientation of the peel roll to the second orientation.

20. The method as claimed in claim 17, wherein the label peel assembly is circular about a central axis and is mounted for rotation about a rotation axis that is offset by a non-zero amount from the central axis.

* * * * *